June 10, 1952 J. F. RUDE 2,600,331
DISK HARROW ANGLING MECHANISM
Filed Jan. 27, 1949 4 Sheets-Sheet 1

INVENTOR
JOHN F. RUDE
BY
Toulmin & Toulmin
ATTORNEYS

June 10, 1952 J. F. RUDE 2,600,331
DISK HARROW ANGLING MECHANISM
Filed Jan. 27, 1949 4 Sheets-Sheet 2

INVENTOR
JOHN F. RUDE
BY
Toulmin + Toulmin
ATTORNEYS

June 10, 1952  J. F. RUDE  2,600,331
DISK HARROW ANGLING MECHANISM
Filed Jan. 27, 1949  4 Sheets-Sheet 3

INVENTOR
JOHN F. RUDE
BY
*Toulmin & Toulmin*
ATTORNEYS

June 10, 1952  J. F. RUDE  2,600,331
DISK HARROW ANGLING MECHANISM
Filed Jan. 27, 1949  4 Sheets-Sheet 4
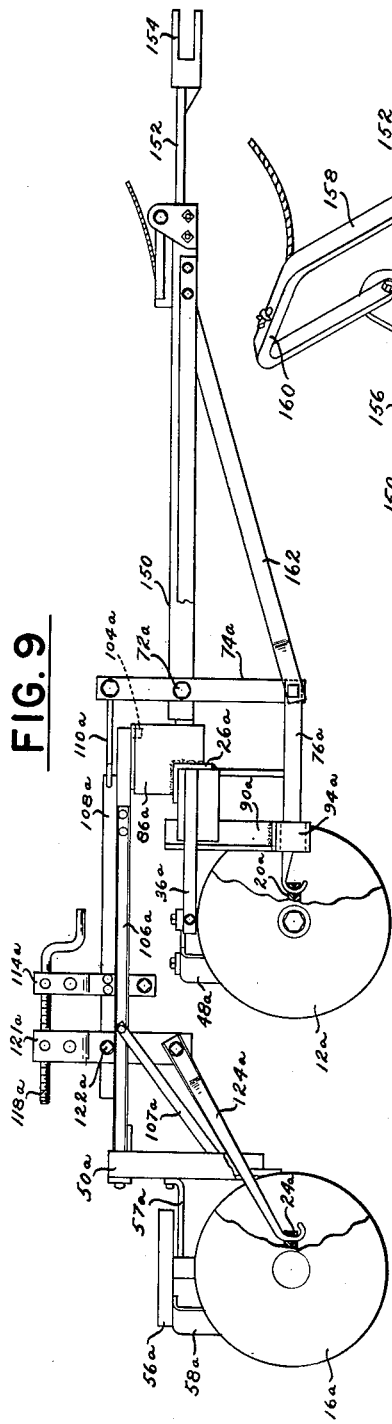
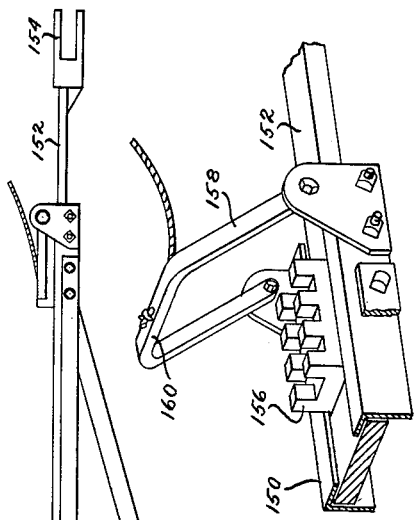
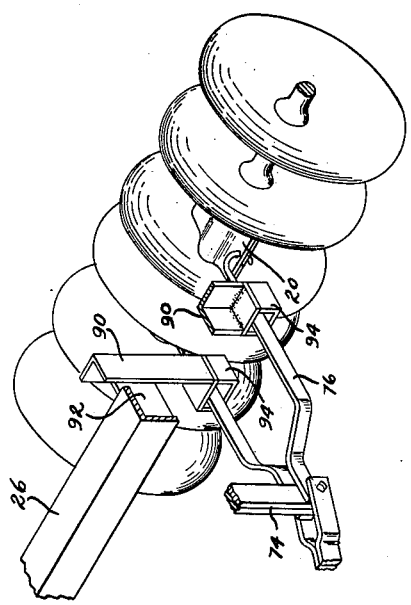
INVENTOR
JOHN F. RUDE
BY
Toulmin + Toulmin
ATTORNEYS Patented June 10, 1952

2,600,331

UNITED STATES PATENT OFFICE 2,600,331

DISK HARROW ANGLING MECHANISM

John F. Rude, Evansville, Ind., assignor to Alvan V. Burch, Evansville, Ind.

Application January 27, 1949, Serial No. 73,081

8 Claims. (Cl. 55—83)

This invention relates to harrows, and particularly to tandem disc harrows especially adapted for being provided with a tractor lift type hitch.

Tandem disc harrows ordinarily fall into two general classifications: the type which is provided with a draw bar for drawing them across the ground to be worked and which ordinarily has the rear gangs flexibly connected with the front gangs so that the harrow can be turned without lifting it from the ground; and the type adapted for being connected with a tractor hitch of the lift type and in which the rear gangs are usually rigidly connected with the forward gangs so that the entire harrow can be lifted by the tractor hitch. This last mentioned type has the disadvantage in that it is difficult to turn the harrow without lifting it from the ground. Since the harrow must be turned at each end of the field being worked it will be evident that this is a marked disadvantage. Furthermore, when the rear gangs are thus rigidly connected with the front gangs, a desirable degree of flexibility of the gangs relatively in the vertical direction is thereby lost and the ground working characteristics of the harrow are diminished.

One of the primary objects of the instant invention is the provision of a tandem type disc harrow adapted for being connected with a tractor hitch of the lift type but in which the rear gangs are flexibly connected with the front gangs.

A still further object of this invention is the provision of an arrangement for a tandem type disc harrow adapted for being connected with a tractor hitch of the lift type in which the entire harrow can be elevated from the ground by the tractor hitch, but in which the rear gangs are flexible in a horizontal plane when the harrow is on the ground thereby permitting a turning movement of the harrow without elevating it.

A still further object is the provision of an improved construction for tandem disc harrows in which the rear gangs are freely flexible in both vertical and horizontal planes relative to the front gangs and in which the entire harrow can be elevated as a unit for transporting.

It is also an object to provide a tandem type disc harrow having an improved arrangement for relatively canting the gangs relative to each other.

A still further object is the provision of a disc harrow construction in which the gangs can be canted relative to each other and including an adjustment whereby the canting of the rear gangs can be adjusted independently of those of the front gangs.

It is also an object of this invention to provide an arrangement for a tandem type type disc harrow which is adapted for connection with either a tractor type lifting hitch or with a draw bar.

Various other and more detailed objects and advantages of the invention such as arise in connection with carrying out the above noted ideas in a practical embodiment will in part become apparent and in part be hereinafter stated as the description of the invention proceeds.

For a full and more complete understanding of the invention, reference may be made to the following description and accompanying drawings wherein:

Figure 8 is a perspective view showing a snubber arrangement for holding the inner ends of the front gang pair down against the earth being worked.

Figure 9 is a side view similar to Figure 3 but showing the harrow of this invention connected with a draw bar type draft device.

Figure 10 is a fragmentary perspective view of a portion of the draw bar of Figure 2 showing the means provided therein for canting the gangs of the harrow relative to each other.

Figure 1:
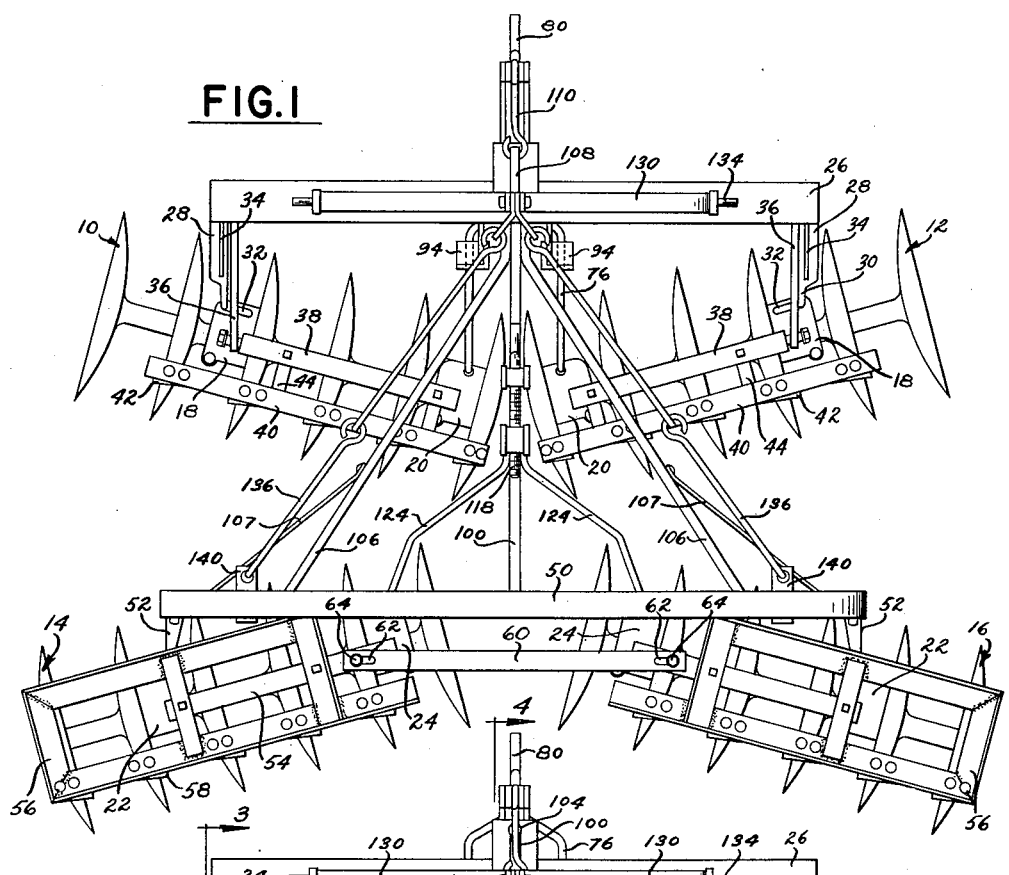
Figure 1 is a plan view of a harrow constructed according to my invention and with the gangs of the front and rear pairs canted relative to each other. The harrow construction illustrated in Figure 1 is provided with means for connection to a tractor hitch of the lift type.

Referring more in detail to the drawings, and more particularly to Figures 1 through 8, the harrow construction shown therein comprises a front pair of gangs indicated at 10 and 12 and a rear or tandem pair of gangs indicated at 14 and 16.

Each of the gangs includes a plurality of disc members mounted on a shaft and having spacing spools therebetween. Each of the assembled gangs has an outer and an inner bearing. On the front gangs the outer bearings are at 18 and the inner bearings are at 20. The outer bearings for the rear gangs are indicated at 22 and the inner bearings therefor at 24.

A transverse member 26, which is an angle, is disposed forwardly of the front gangs and secured to the outer ends of the member 26 or arms 28 which carry draft hooks 30 that engage the slotted eyes 32 in the housings of the bearings 18. Brace members 34 may be provided for added support of the draft hooks on the member 26.

The member 26 also has secured adjacent its outer ends and extending rearwardly therefrom the arms 36 that engage the standards 38 of the front gangs and which standards extend between and are secured to the aforementioned bearings. The standards also provide support for the bars 40 which mount the scraper elements 42. Straps 44 are connected between the bars 40 and the standards 38 as shown in the drawings.

Positioned forwardly of the rear gangs 14 and 16 is a U-shaped member 50 which is angular in cross-section and which has secured to the lowermost points of its downturned ends the rearwardly extending draft hooks 52 which engage eyes in the bearings 22. The rear gangs 14 and 16 have the standards 54 which are similar to the standards 38 of the front gangs and which are likewise similarly connected between the bearings 22 and 24 of the rear gangs. The rear gangs include the boxes or frames 56 which are mounted on the standards 54 and which are useful for receiving weights to hold the tandem gangs down against the earth. The rear parts of the boxes 56 also provide supports for the scraper elements 58 for the discs of the rear gangs.

The boxes and standards are held upright by the straps 57 which extend therefrom forwardly and are secured to the turned down end parts of the member 50 as at 59. The connection between the straps 57 and the standards 54 is pivotal so that the standards can turn between their Figures 1 and 2 position.

The standards 54 are preferably interconnected by the relatively heavy bar 60 having the slots 62 in the ends thereof for receiving the bolts 64 that extend into the standards 54.

Figure 3:
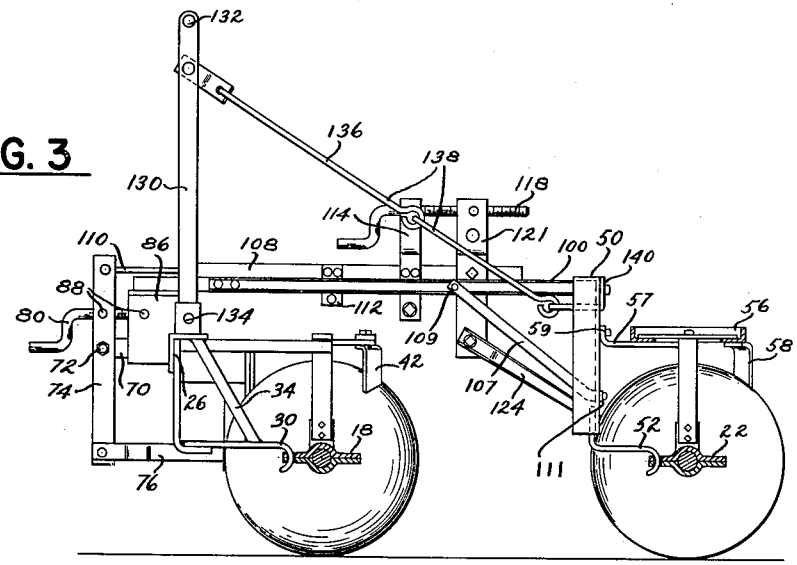
Figure 3 is a sectional view indicated by the line 3—3 on Figure 2.
Figure 4:
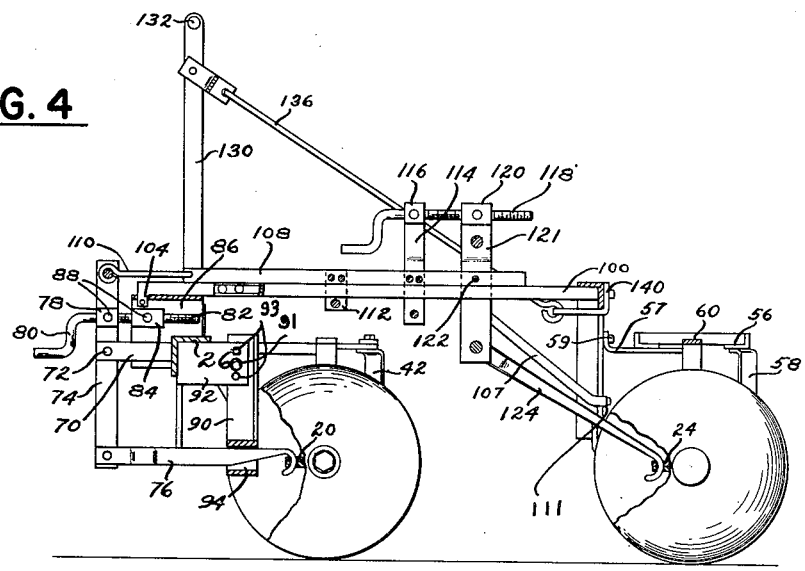
Figure 4 is a view similar to Figure 3 but taken near the center of the harrow and indicated by the line 4—4 on Figure 2.
Figure 5:
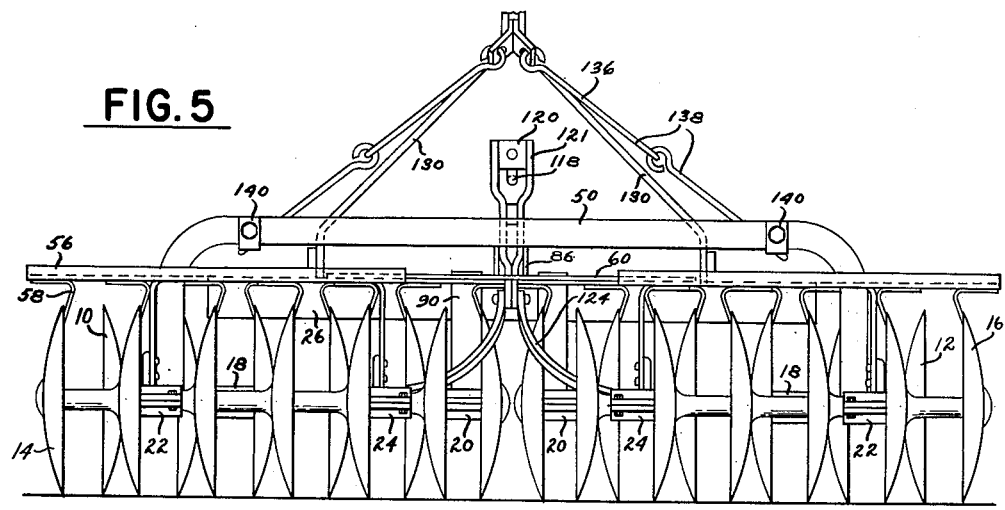
Figure 5 is a rear view of the harrow as it would be seen looking from the rear of Figure 2 with the harrow on level ground.

Turning now to Figures 3 and 4, the connections to the inner bearings of the front and rear gangs will be clearly seen. Mounted substantially in the center of the cross bar 26 and extending forwardly therefrom is an arm means 70. Pivoted to the forward end of the arm means 70 as by the pivot 72 is a vertically extending lever 74 which, at its lower end, is pivotally connected with a pair of rearwardly extending draft hooks 76 that engage eyes in the inner front gang bearings 20 as will be seen in Figures 1 and 4. Above the pivot 72 the lever 74 pivotally supports a block 78 in which is journaled a crank 80 having a screw threaded part as at 82 extending through a nut 84. The nut 84 is pivoted in a frame 86 that is mounted on and secured to the cross bar 26 as by bolts. The pivot means for both the block 78 and the nut 84 may comprise the trunnions shown at 88.

It will be evident that rotation of the crank 80 will adjust the position of the block 78 relative to the nut 84 and thus cause the lever 74 to pivot about its connection with the arm means 70. This movement of the lever will be accompanied by movement of the draft hooks 76 which, in turn, will adjust the inner ends of the front gangs relative to the outer ends thereof and provide the desired canting movement of the said gangs.

Inasmuch as the inner ends of the front gangs tend to raise upwardly when the harrow is working, there are preferably provided snubber means which embrace the draft hooks 76 as will be seen in Figures 4 and 8. These snubber means comprise angle members 90 which are secured to the cross members 26 as by the plates 92 and which extend downwardly to have mounted thereon the box-like structures 94 and through which the draft hooks 76 extend. It will be apparent that these snubbers permit free axial movement of the draft hooks 76 but limit their up and down movement.

The members 90 are secured to plates 92 by bolts 91, and there are preferably provided additional bolt receiving apertures to permit vertical adjustment of members 90 if desirable or necessary.

Figure 2:
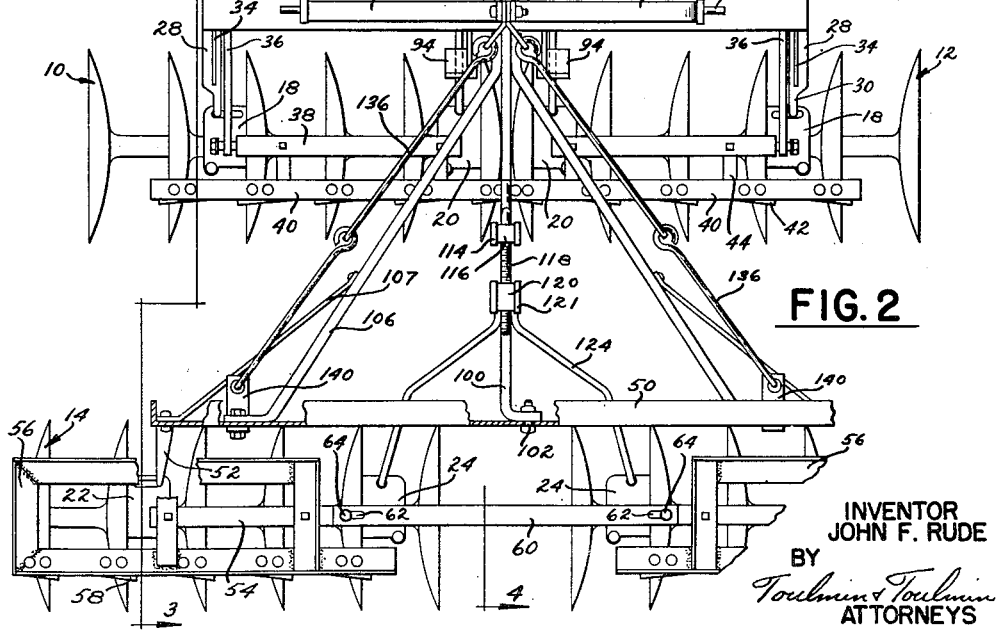
Figure 2 is a plan view similar to Figure 1 but showing the gangs adjusted into parallelism with each other.

The draft connection between the front and rear gangs comprises a central and longitudinally existing draft bar 100 which at its rear end is bolted to the frame member 50 of the tandem gangs as indicated at 102 in Figure 2. This draft bar extends forwardly and overlies the upper plate of the frame 86 and has a turned down end part 104 extending through the said plate as will best be seen in Figure 4. The draft bar 100 is thus effective for transmitting draft from the member 26 to the member 50 but, due to its pivotal connection with the frame 86, permits free pivoting movement of the tandem gangs in a horizontal plane relative to the front gangs. This flexibility in a horizontal plane permits the turning of the harrow while it is on the ground and without any excessive dragging of the harrow gangs as is the case when it is attempted to turn a harrow having a rigid connection between the front and rear gang pairs.

As will be seen in Figures 1 and 2, the draft bar 100 is braced so as to be rigid relative to the member 50 by the diagonally extending brace bars 106. These brace bars absorb thrusts on the member 50 which would tend to bend the draft bar 100.

The U-shaped member 50 is braced against movement in a vertical plane about its connection with the rear end of the draft bar 100 and the rear ends of the brace bars 106 by the diagonal members 107 that are connected at their upper ends as at 109 with the brace bars 106 and at their lower ends as at 111 with the turned down end parts of the member 50. The members 107 are principally tension members and assist in transmitting draft to the cross member 50.

Slidably superimposed on the bar 100 is a second bar 108 which, at its left-hand end, is pivotally connected with the upper end of the lever 74 as by the link 110. A bracket indicated at 112 is secured to the bar 108 and embraces the bar 100 for slidably guiding the bar 108 in reciprocatory movement along the said bar 100. Rearwardly of the bracket 112 there is mounted an upwardly extending arm 114 on the bar 108 and at the upper end of this bar is pivotally mounted a block 116 through which the crank element 118 extends. The crank element 118 is threaded and extends through a nut 120 pivotally mounted in the upper end of a lever 121 that is pivoted adjacent the rear end of the bar 108 as at 122.

The lever 121 extends downwardly beyond the bar 100 and has pivotally connected therewith a pair of draft hooks 124 that are connected with eyes in the housings of the inner bearings 24 of the rear gangs. It will be evident that the lever 121 is normally rigid with the bar 108 so that reciprocatory movement of the bar 108 as brought about by movement of lever 74 by the crank 80 will cause movement of the draft hooks 124 and thereby cant the rear gangs relative to each other.

It will also be observed that the bar 108 is connected with the lever 74 on the opposite side of the pivot means 72 thereof from the draft hooks 76 and that, therefore, the canting of the rear gangs when the crank 80 is adjusted will be in the opposite sense to the canting of the front gangs. This is brought out in Figure 1 wherein it will be seen that the inner ends of the front gangs have been moved backwardly while the inner ends of the rear gangs have been moved forwardly.

Means are provided for adjusting the rear gangs independently of the front gangs and this means will be seen to comprise the crank 118, its supporting arm 114 and the lever 121. Upon adjustment of the crank 118 the lever 121 will rotate about its pivotal support 122 and shift the draft hooks 124 thereby to adjust the angular position of the rear gangs relative to each other independently of the front gangs.

Upstanding from the cross member 26 are a pair of bars 130 which form a portion of a hitch device for connecting the harrow to a tractor. Connections to a usual type tractor hitch include a connection to the aperture 132 at the upper ends of the bars 130 and to the studs 134 extending outwardly from the lower ends of the said bars. In order to lift the rear gangs when the front gangs are elevated by lifting of the aforementioned bars and the cross member 26 by their connection with a tractor hitch, there is provided a pair of flexible inextensible connections extending from the upper ends of the bars 130 to spaced points on the member 50 of the rear gangs. These flexible inextensible members are indicated at 136 and each will be seen to comprise a pair of links 138 which are connected by means of eyes with the upper ends of the bars 130 and with each other and with the clips 140 which are secured to the member 50.

Figure 6:
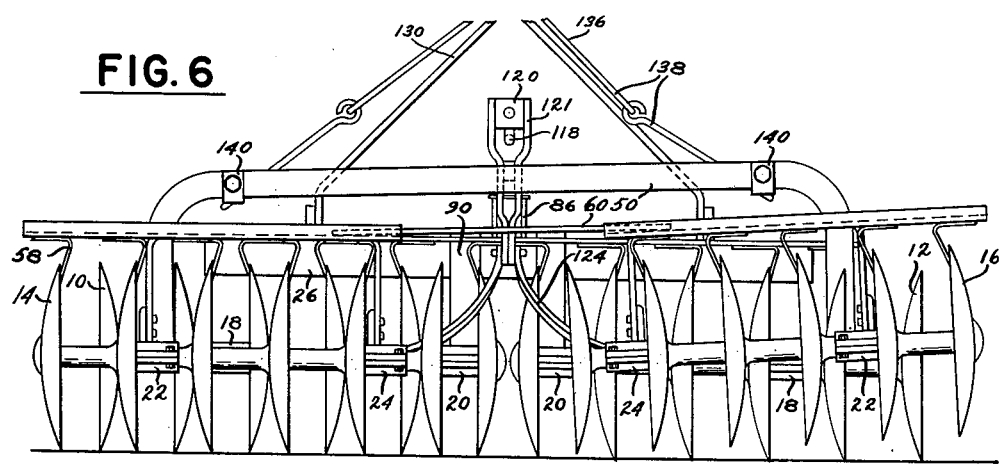
Figure 6 is a view similar to Figure 5 but showing the right-hand gang of the tandem pair elevated as it would be if it were passing over a high spot in the ground being worked.
Figure 7:
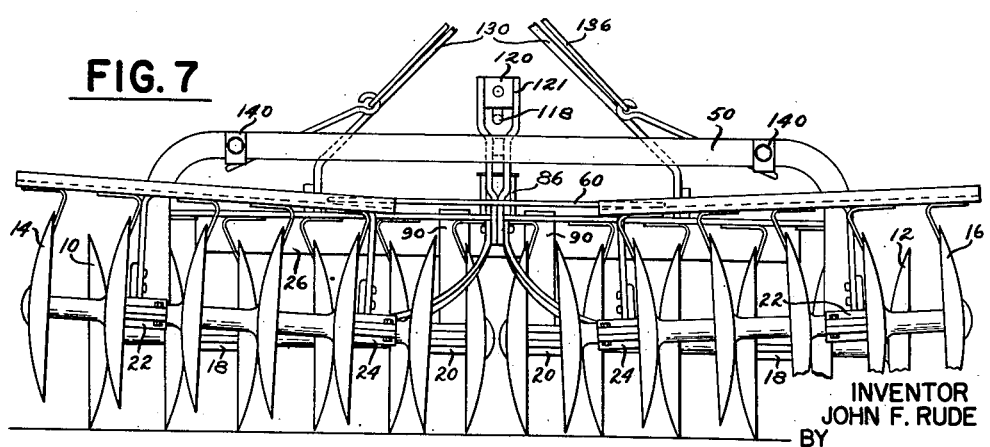
Figure 7 is a view similar to Figure 6 but showing the outer ends of both of the gangs of the tandem pair lifted.

It will be apparent that the connections 136 provide means whereby the entire harrow can be elevated as a unit by a tractor hitch of the lift type but at the same time these connections do not detract from the flexibility of the harrow in either a horizontal or a vertical plane. The flexibility of the harrow in a vertical plane is illustrated in Figures 6 and 7 and in these figures it will be noted that the links 138 break at their connection in order to permit lifting of either or both of the rear gangs of the harrow. At the same time, the flexibility of the rear harrow gangs in a vertical plane can advantageously be somewhat limited by means of the heavy bar 60 extending therebetween. Flexibility of the harrow is of advantage in permitting it to adjust itself to the contour of the ground being worked and to permit turning of the harrow while it is on the ground, while limiting of the flexibility of the harrow in a vertical direction is effective for insuring that excessively high spots in the ground will be worked down.

It is to be noted that the connections 136 and the link 110 between the bar 108 and the lever 74 are so arranged as not to inhibit the flexibility of the harrow in a horizontal plane. This freedom of flexibility is due to the fact that both the connections 136 and the link 110 make connections by means of eyes in positions generally vertically above the pivotal connection of the draft bar 100 with the frame 86.

In Figures 9 and 10 the harrow is shown arranged for connection with a draw bar. Substantially all parts of the harrow proper are identical with those shown in Figures 1 through 8, therefore, corresponding numerals are employed with the addition of a subscript $a$.

In these figures, however, in place of the structure for connecting the harrow with a tractor hitch, there is a draw bar 150 which connects with the member 26a. This connection may be, as shown, adjacent the pivot means 72a of the lever 74a. This draw bar 150 is formed of a pair of angles as will be seen in the perspective view, Figure 10. Slidably mounted within the angles is another bar 152 and which carries at its forward end a clevis or other suitable hitching device 154. The bar 152 also mounts the notched block 156 and a yoke 158 is pivoted on the draw bar 150 so that the closed end thereof as at 160 can be dropped into one or the other of the notches in the block 156. It will be seen that this arrangement provides for selective adjustment of the bar 152 along the draw bar 150. The adjustability of the bar 152 along the draw bar 150 is utilized for canting the gangs by means of the connection shown at 162 and which connects the bar 152 with the lower end of lever 74a.

It will be evident that the harrow arrangement shown in Figures 9 and 10 is the full equivalent of that shown in Figures 1 through 8 as regards the general harrow construction, the canting of the front and rear gangs, the independent adjustability of the rear gangs, and the other features referred to in connection with the arrangement of Figures 1 through 8, but the harrow is not adapted for being elevated for transporting due to the elimination of the inextensible connections 136 and the upright bars 130 which, in the construction shown by Figures 1 through 8, form the means for connecting the harrow with a tractor hitch of the lift type.

The advantages of the harrow construction shown and described may be summarized as follows: the harrow is strong but is relatively inexpensive to manufacture. The harrow has flexibility between the front and rear gangs such that it can readily be turned while all of the discs are in working engagement with the ground. The harrow gangs have flexibility in the vertical direction thereby permitting the harrow to follow the contour of the ground. The aforementioned flexibility in the vertical direction is limited so that high spots can be effectively worked down.

The harrow is adapted for connection with a tractor hitch of the lift type and without losing any of its inherent flexibility. It is relatively simple to convert the harrow from a tractor hitch type to a draw bar hitch type.

While preferred specific embodiments of the invention are hereinbefore set forth, it is to be clearly understood that the invention is not to be limited to the exact construction illustrated and described, because various modifications of these details may be provided in putting the invention

I claim:

1. In a tandem disc harrow having front and rear pairs of gangs, a transverse beam for each gang pair pivotally connected with the outer ends thereof, a draft bar rigid with the rear beam and pivotally connected with the front beam at the center thereof, a lever pivoted between its ends on the front beam, draft hooks connecting the lower end of the lever with the inner ends of said front gangs, a second bar slidably guided on said draft bar and pivotally connected at its forward end with the upper end of said lever and adjustably connected at its rear end with the inner ends of the rear gangs, a structure upstanding from said front beam for connecting the harrow to a lift type tractor hitch, and means for exerting lifting force on the rear beam when the harrow is elevated comprising jointed members having their ends pivotally connected to an upper central point of said structure and their other ends connected to laterally spaced points on said rear beam, the pivotal connection of said jointed member to said structure and of said other bar to said lever being generally in vertical alignment with the pivotal connection of said draft bar and front beam whereby free swinging of the rear gang structure relative to the front gangs obtains.

2. In a tandem disc harrow having front and rear pairs of gangs and front and rear transverse beams pivotally connected with the outer ends of said gangs, a draft bar connecting the middle parts of said beams, a lever pivoted on the front beam and having its lower end connected with the inner ends of said front gangs, a second bar slidably mounted on said draft bar and connected to the upper end of said lever, a second lever pivoted between its ends to the rear end of said second bar and having its lower end connected with the inner ends of said rear gangs, and means for independently angularly adjusting said levers about their pivotal supports.

3. In a tandem disc harrow having front and rear pairs of gangs; front and rear transverse beams pivotally connected with the outer ends of said gangs, a longitudinal draft bar extending between said beams rigid with the rear beam and pivoted to the front beam, a vertical lever pivoted between its ends to the front of the front beam and connected at its lower end with the inner ends of said front gangs, a second bar slidably mounted on said draft bar and connected to the upper end of said lever, a second vertical lever pivoted to the rear end of said second bar and having its lower end connected with the inner ends of said rear gangs, means normally holding said second lever and second bar rigid but adjustable for changing the position of said second lever on the bar, and means for adjusting said first lever about its pivot to cant said gangs.

4. In a tandem disc harrow having front and rear pairs of gangs; front and rear transverse beams pivotally connected with the outer ends of said gangs, a longitudinal draft bar extending between said beams rigid with the rear beam and pivoted to the front beam, a vertical lever pivoted between its ends to the front of the front beam and connected at its lower end with the inner ends of said front gangs, a second bar slidably mounted on said draft bar and connected to the upper end of said lever, a second vertical lever pivoted to the rear end of said second bar and having its lower end connected with the inner ends of said rear gangs, screw threaded means normally holding said second lever and second bar rigid but adjustable for changing the position of said second lever on the bar, and means for adjusting said first lever about its pivot to cant said gangs.

5. In a tandem disc harrow having front and rear pairs of gangs; front and rear transverse beams pivotally connected with the outer ends of said gangs, a longitudinal draft bar extending between said beams rigid with the rear beam and pivoted to the front beam, a first vertical lever pivotally supported between its ends on the front of the front beam and connected at its lower end with the inner ends of said front gangs, a second bar slidably mounted on said draft bar and connected to the upper end of said first lever, a second vertical lever pivotally supported on the rear end of said second bar and having its lower end connected with the inner ends of said rear gangs, and independent adjustable clamping means for said levers for clamping the levers in any of a plurality of positions of angular adjustment on their respective pivotal supports.

6. In a tandem disc harrow having front and rear pairs of gangs; front and rear transverse beams pivotally connected with the outer ends of said gangs, a longitudinal draft bar extending between said beams rigid with the rear beam and pivoted to the front beam, a vertical lever pivoted between its ends to the front of the front beam and connected at its lower end with the inner ends of said front gangs, a second bar slidably mounted on said draft bar and connected to the upper end of said lever, a second vertical lever pivoted to the rear end of said second bar and having its lower end connected with the inner ends of said rear gangs, screw threaded means normally holding said second lever rigid on said second bar, and screw threaded means normally holding said first lever rigid on said front beam, and said means being independently adjustable for canting said gangs.

7. In a tandem disc harrow having front and rear pairs of gangs and front and rear transverse beams pivotally connected with the outer ends of said gangs, a draft bar connecting the middle parts of said beams, a first lever pivoted on the front beam and having its lower end connected with the inner ends of said front gangs, a second bar slidably mounted on said draft bar and connected to the upper end of said first lever, a second lever pivoted between its ends to the rear end of said second bar and having its lower end connected with the inner ends of said rear gangs said draft bar being pivoted to the front one of said beams and said second bar being jointed adjacent its front end to permit swinging movement of said rear gangs when the harrow is turning, first adjustable means connecting said first lever and said beam to provide for a plurality of adjusted positions of said first lever about its pivotal support on the beam, and second adjustable means connecting said second lever and said second bar to provide for a plurality of adjusted positions of said second lever about its pivotal support on the said second bar.

8. In a tandem disc harrow having front and rear pairs of gangs, a frame for each pair including a transverse draft beam pivotally connected with the outer ends of the corresponding gangs, a draft bar rigid with the rear beam and extending forwardly and pivotally connected with the front beam, a lever pivoted between its ends on the front beam, draft hooks connecting the lower end of the lever with the inner ends of the front gangs, other draft hooks engaging the inner ends of the rear gangs, a second bar slideably mounted on said draft bar connected with said other draft hooks at its rear end and with the upper end of said lever at the front end, said second bar being jointed rearwardly of its front end and adjacent the pivotal connection of said draft bar and front beam to permit free swinging of said rear gang pair in a horizontal plane, and said second bar comprising means between its ends adjustable for varying the effective length of said second bar.

JOHN F. RUDE.

REFERENCES CITED

The following references are of record in the file of this patent:

UNITED STATES PATENTS

| Number | Name | Date |
|---|---|---|
| Re. 22,627 | McKay | Apr. 3, 1945 |
| 1,487,388 | Johnson | Mar. 18, 1924 |
| 1,489,020 | Smith | Apr. 1, 1924 |
| 1,497,956 | Stewart | June 17, 1924 |
| 2,320,624 | Love | June 1, 1943 |
| 2,376,609 | McVicar | May 22, 1945 |

OTHER REFERENCES

Farm Implement and Machinery Review, volume 74, No. 880, dated August 1, 1948, page 364; Bental advertisement.